United States Patent [19]

Oeckl et al.

[11] Patent Number: 4,695,556

[45] Date of Patent: Sep. 22, 1987

[54] CATALYST RESINS AND PROCESS FOR THEIR PREPARATION

[75] Inventors: Siegfried Oeckl, Bergisch Gladbach; Alfred Mitschker, Odenthal-Holz; Peter M. Lange, Leverkusen; Friedrich Martinola, Cologne, all of Fed. Rep. of Germany

[73] Assignee: Bayer Aktiengesellschaft, Leverkusen, Fed. Rep. of Germany

[21] Appl. No.: 909,995

[22] Filed: Sep. 22, 1986

[30] Foreign Application Priority Data

Aug. 6, 1986 [DE] Fed. Rep. of Germany ....... 3626581

[51] Int. Cl.$^4$ ..................... B01J 31/08; B01J 31/10; B01J 37/30
[52] U.S. Cl. ...................................... 502/11; 502/159
[58] Field of Search ................................ 502/11, 159

[56] References Cited

U.S. PATENT DOCUMENTS

| | | | |
|---|---|---|---|
| 3,574,763 | 4/1971 | Wollner et al. | 502/159 X |
| 3,953,517 | 4/1976 | Schmitt et al. | 502/11 X |
| 3,960,962 | 6/1976 | Shubkin | 502/159 X |
| 4,330,679 | 5/1982 | Kohler et al. | 502/159 X |

OTHER PUBLICATIONS

Brochure—"The Etherol Process from BP".

*Primary Examiner*—Patrick P. Garvin
*Attorney, Agent, or Firm*—Sprung Horn Kramer & Woods

[57] ABSTRACT

The invention relates to a new process for the preparation of strongly acid cation exchangers loaded with catalytically active metals by loading the cation exchangers with a solution of a salt of the catalytically active metal and reducing the cation exchangers loaded with metal ions, according to which the loading of the cation exchangers is carried out at temperatures from 50° to 120° C. and formic acid is used as the reducing agent; the invention also relates to the catalyst resins which can be obtained by the process.

9 Claims, No Drawings

CATALYST RESINS AND PROCESS FOR THEIR PREPARATION

The invention relates to a new process for the preparation of strongly acid cation exchangers loaded with catalytically active metals and to the catalyst resins which can be obtained by this process.

Ion exchangers based on synthetic resins and loaded with catalytically active metals are described as "catalyst resins" amongst experts and within the context of the present invention.

Strongly acid cation exchangers loaded with catalytically active metals are known. These catalyst resins have become increasingly important for industrial processes because of their bifunctionality. As a result, detailed attention has also been given to their preparation. It has been the aim of all the hitherto known preparative processes for catalyst resins to obtain resins which have the highest possible catalytic activity for the longest possible operational time and which retain this activity even when stored for a prolonged period.

The processes hitherto known for the preparation of strongly acid cation exchangers loaded with catalytically active metals can be divided into two different types:

A. Processes in which the cation exchanger is first loaded with a solution of a salt of the catalytically active metal and is then treated with the reducing agent; processes of this type are described, for example, in DE-AS (German Published Specifications) No. 1,260,454 (=USP 3,574,763), No. 1,800,379 (GB-P No. 1 236 615) and No. 1,800,380 (GB-P No. 1 236 616), DE-OS (German Published Specification) No. 1,643,044 (=USP 3,953,517) and EP-A No. 0,043,986 (=USP 4,330,679) and No.0,087,658.

B. Processes in which the cation exchanger is first loaded with the reducing agent and is then treated with a solution of a salt of the cationic metal; processes of this type are described, for example, in DE-AS (German Published Specification) No. 1,800,379 and German patent specification No. 1,112,047.

Compared with the processes of type A, the processes of type B have the disadvantage that the reducing agent which has been fixed on the cation exchanger can only be removed again from the resin with a considerable effort, after the reduction, and that the activity of the resulting catalyst resins is lower, because the procedure results in the deposition of metal agglomerates which are less catalytically active and not in a monomolecular distribution of the metal within the resin. Because the processes of type A can be carried out more easily and because of the more advantageous properties of the catalyst resins obtained in these processes, the processes of type A are predominantly used for the preparation of catalyst resins. Nevertheless, not even the cation exchangers prepared by process A meet the high requirements nowadays demanded for the activity and service life of catalyst resins. In particular, in the processes described in EP-A Nos. 0,043,986 and 0,087,658 for the preparation of alkyl tert.-alkyl ethers and processes for the catalytic reaction of an isoalkene with the simultaneous substantial removal, by hydrogenation, of acetylene compounds, carbonyl compounds and, if appropriate, diolefines, there has existed a need for catalyst resins of higher kinetic effectiveness which permit the use of higher flow rates of the compounds to be hydrogenated and, notwithstanding, result in the complete reaction desired.

It has now been found, surprisingly, that catalyst resins having a substantially improved activity are obtained if the procedure followed is in accordance with process type A, but the loading of the strongly acid cation exchangers is carried out, not as hitherto at room temperature, but at an elevated temperature, and the reducing agent used for the reduction of the loaded cation exchangers is not one of those used hitherto, such as hydrazine, hydroxylamine, hydrogen or carbon oxide, but is formic acid. As a result of these new process measures, loading at an elevated temperature and reducing the cation exchangers loaded with the metal ions by means of formic acid, the catalytic activity of the catalyst resins is increased by a factor of up to several times compared with the catalytic activity of the catalyst resins prepared by the hitherto known processes of type A.

The invention therefore relates to a process for the preparation of strongly acid cation exchangers loaded with catalytically active metals by loading the cation exchangers with solutions of the salts of the catalytically active metals and reducing the cation exchangers loaded with metal ions, which is characterized in that the loading of the cation exchangers is carried out at temperatures from 50° to 120° C., preferably 70° to 100° C., and that formic acid is used as the reducing agent.

The invention also relates to catalyst resins preferably loaded with palladium which have been obtained by loading strongly acid cation exchangers with solutions of salts of the catalytically active metals, preferably palladium salt solutions, at temperatures from 50° to 120° C. and reducing with formic acid the cation exchanger loaded with ions of the catalytically active metal.

The formic acid is used in an amount of at least 1 g per liter of resin; there is no upper limit to this amount; it is even possible to use formic acid as a suspension medium for a reduction mixture. Preferably, however, the amount of formic acid employed is 10 to 2,000 g per liter of resin, particularly preferably 100 to 1,200 g per liter of resin.

Suitable catalytically active metals are, above all, the metals of the 8th subgroup of the periodic system of the elements, in particular palladium and platinum. The process according to the invention is particularly suitable for the preparation of strongly acid cation exchangers loaded with palladium.

The salts of these catalytically active metals are applied in form of solutions in polar organic solvents, such as non reducing lower aliphatic carbonic acids, e.g. acetic acid, or mono- or polyhydric alcohols, e.g. methanol, ethanol, ethylene glycol, diethylene glycol, which solutions may contain also some water.

The strongly acid cation exchangers used are preferably commercial strongly acid cation exchangers based on polystyrene sulphonic acids which have been cross-linked with divinylbenzene. The strongly acid cation exchangers can be gel-type or can be macroporous; it is preferable to employ macroporous cation exchangers.

The process according to the invention is preferably carried out as follows: The strongly acid cation exchanger is suspended in demineralised water. A solution of the calculated amount of a salt of the catalytically active metal, preferably palladium, is added to the suspension with stirring at temperatures from 50° to 120° C., preferably 70° to 100° C. The amount of metal salt depends on the desired degree of loading of the cation exchanger. At a given temperature within the range claimed, it is possible to adjust the depth of penetration of the metal ions into the grains of the cation exchanger, and hence the activity of the catalyst, by means of the rate at which the metal salt solution is added to the cation exchanger. It has been found, surprisingly, that, when loading is carried out in accordance with the invention at an elevated temperature, the more slowly the metal salt solution is added, the lower is the depth of penetration.

It has been found that catalyst resins having particularly advantageous properties, high catalytic activity and, at the same time, a long life (service life) are obtained if, at the temperature used, the rate of addition chosen is such that the catalytically active metal is deposited under the surface of the resin in a shell the thickness D of which is at least 1/25 of the radius R of the resin grain and not more than half the radius R of the resin grain, that is to say the thickness D thereof is 0.04 to 0.5 R. Preferably D is 0.08 to 0.4 R.

The distribution of the metal within the resin grains and the thickness D of the metal shell can be determined without difficulty by simple microscopic examination of the cross-sections of the resin grains.

When the adsorption of the metal ions by the cation exchanger is complete—it can be detected by the decolouration of the suspension—the liquid phase is drained off to such an extent that the cation exchanger is still just covered by liquid. Formic acid is then added with stirring and at an elevated temperature to the mass thus obtained, and stirring is continued until the reduction is complete (detectable by the change in colour of the cation exchanger; if palladium is used, the colour of the cation exchanger at the start of the reduction is yellow-grey, while the colour of the catalyst resin at the end of the reduction is grey).

The resin is then removed from the liquid phase and washed with demineralised water until the pH of the water washings has a value of 6 to 7.

Compared with the reducing agent generally used, hydrazine, the reducing agent formic acid has the great advantage that it can be removed from the resin considerably more easily. Whereas if formic acid is used as the reducing agent washing the reduced catalyst resin with a few bed volumes of demineralised water is sufficient to bring the resin into a state ready for operation, the reducing agent hydrazine requires a complete regeneration with acids, for example HCl, of the cation exchanger obtained after the reduction (see DE-AS (German Published Specification) No. 1,112,047, Example 1).

Reduction using hydrogen of the cation exchangers loaded with metal ions has the disadvantage that it requires dry resins if it is carried out at elevated temperatures. However, compared with reduction in the moist state, reducing the resins in a dried state results in an altered catalyst structure and hence in a decrease in the catalytic activity of the resins.

If, on the other hand, the reduction is carried out at room temperature, it is not only necessary to flush the resins thoroughly beforehand with nitrogen, but it is also necessary to accept uneconomically long reduction times.

The successful use of formic acid as a reducing agent for metal ions applied to cation exchangers is surprising because it is recommended, according to the state of the art (see German Patent Specification No. 1,112,047), that, in order to avoid detachment of the metal ions, the reducing agents used should be weak electrolytes or nonelectrolytes, such as hydrazine, hydroxylamine, carbon monoxide or phosphorous acid, and that the pH of the solution should be kept close to 7; accordingly, only formates, that is to say salts of formic acid, and these, moreover optionally linked to an anionic exchange resin, are mentioned as possible reducing agents in DE-AS (German Published Specification) No. 1,800,379 (=GB-P No. 1 236 615).

It has been found, surprisingly, not only that formic acid in the process according to the invention is an excellently effective and readily removable reducing agent, but also that, if the reduced catalyst resins are not very thoroughly washed, the residual amounts of formic acid remaining in these resins produce an increased stability on storage of the catalyst resins in a moist state. The alteration in the noble metal coating frequently observed when the reduced catalyst resins are stored in a moist state can be prevented if the catalyst resin, in a water-moist condition, has a certain content of formic acid, 0.01 to 10% by weight, relative to the weight of the moist catalyst resin.

EXAMPLE 1

10 ml of macroporous, strongly acid cation exchanger based on polystyrene sulphonic acid cross-linked with 18% by weight of divinylbenzene (total capacity of sulphonic acid groups: 1.35 mol/l of resin), in a beaker, are made up to a total volume of 20 ml with demineralised water. A solution of 20 mg of palladium acetate ($=10$ mg of Pd) in 1 milliliter of glacial acetic acid is added to the suspension in the course of one minute, with stirring and at 90° C. The suspension, which initially is yellowish, is decolourised in the course of 25 to 30 seconds. The suspension is stirred for a further 5 minutes in order to complete the adsorption of the palladium ions.

In order to reduce the palladium ions, the liquid phase is drained off until the surface of the resin is reached. 12 g of 98% strength formic acid are added at 90° C., with stirring, to the remaining suspension, and stirring is then continued for a further 15 minutes. During the reduction process the resin changes colour from yellow-grey to grey. When the reduction is complete, the liquid phase is removed and the catalyst resin is washed with 4 bed volumes of demineralised water. The moist resin remaining after the last wash water has run off can be used immediately.

In order to check the distribution of the palladium within the grains of the catalyst resin, cross-sections of resin grains are examined in direct light under a light microscope equipped with a means of measuring length. This examination showed that the metallic palladium forms a clearly deposited dark layer 0.13 mm thick (at an average grain diameter of 1.0 mm) under the surface of the resin grains ($D=0.26$ R).

In order to determine the stability on storage of the catalyst resin obtained, the moist catalyst resin (10 ml) was put into a vessel capable of being tightly closed, 1 g of formic acid was added and the contents were agitated briefly and stored in a closed state for 4 weeks at a temperature of 54° C. (corresponding to a storage time of about 1 year at room temperature). No displacement, broadening or fading of the palladium layer could be observed after storage.

EXAMPLE 2

The procedure was as described in Example 1, only the palladium acetate solution was added dropwise, not in the course of 1 minute, but in the course of 10 minutes.

Microscopic examination of the grains of the catalyst resin obtained in this manner showed that the metallic palladium forms a clearly deposited dark layer 0.10 mm thick (at an average particle diameter of 1.0 mm) under the surface of the resin grains (D=0.2 R).

EXAMPLE 3

The procedure was as described in Example 1, only the palladium acetate solution was added dropwise, not in the course of 1 minute, but in the course of 45 minutes.

Microscopic examination of the grains of the catalyst resin thus obtained showed that the metallic palladium forms a clearly deposited dark layer 0.04 mm thick (at an average particle diameter of 1.0 mm) under the surface of the resin grains (D=0.08 R).

EXAMPLE 4

The procedure was as described in Example 1, only the palladium acetate solution was added at 50° C. in the course of 60 minutes.

Microscopic examination of the grains of the catalyst resin obtained in this manner showed that the metallic palladium forms a clearly deposited dark layer 0.25 mm thick (at an average grain diameter of 1.0 mm) under the surface of the resin grains (D=0.5 R).

EXAMPLE 5

The procedure was as described in Example 1, only the palladium acetate solution was added at 50° C. in the course of 90 minutes.

Microscopic examination of the resin grains showed that the metallic palladium forms a clearly deposited dark layer 0.2 mm thick (at an average particle diameter of 1.0 mm) under the surface of the resin grains (D=0.4 R).

EXAMPLE 6

(Determination of the catalytic activity of the catalyst resins)

Description of the test:

50 ml of catalyst resin of a uniform fraction of grain size 0.5 to 1.0 mm are placed in a glass filter (diameter: 22 mm). Demineralised water saturated with oxygen and containing 12 to 14 mg per liter of hydrazine are pumped downwards through this resin bed at 19° to 20° C. The residual oxygen content in the water emerging from the resin bed is determined by means of a commercial apparatus for oxygen determination at various specific loadings.

The table below shows the residual $O_2$ contents found for the catalyst resins investigated at the specific loadings indicated.

The following catalyst resins were tested:
Resin A: Catalyst resin according to Example 2
Resin B: Catalyst resin according to Example 5
Resin C: Resin according to Example 1 of EP-A No.0,087,658 = Resin according to Example 1 of EP-A No. 0,043,986
Resin D: Resin according to Example 3 of DE-AS (German Published Specification) No. 1,800,379 = Resin according to Example 1 of DE-AS (German Published Specification) No. 1,800,380.

In order to ensure that the catalyst resins were comparable under the test conditions used, all the catalyst resins were prepared from the same strongly acid cation exchanger and were loaded with the same amount of palladium (1 g of palladium per liter of resin) and were sieved to give a uniform fraction of grain size 0.5 to 1.0 mm.

TABLE

| Catalyst resin | Values of residual oxygen ($\mu$g/l) at the following specific loadings (BV/hr): | | | | | | |
|---|---|---|---|---|---|---|---|
| | 600 | 500 | 400 | 300 | 200 | 100 | 50 |
| Resin A | 3600 | 3150 | 2550 | 1675 | 833 | 126 | 22 |
| Resin B | 3800 | 3240 | 2856 | 2128 | 1346 | 361 | 66 |
| Resin C | 6360 | 5930 | 5300 | 4510 | 3280 | 1383 | 340 |
| Resin D | 4600 | 4460 | 3850 | 3130 | 2110 | 713 | 127 |

BV = bed volume

WHAT IS CLAIMED IS:

1. A strongly acid cation exchanger loaded with a catalytically active metal obtained by loading a strongly acid cation exchanger with a solution of the salt of the catalytical active metal at a temperature from 50 to 120° C. and subsequently reducing the cation exchanger loaded with the ions of the catalytical active metal with formic acid.

2. The strongly acid cation exchanger loaded with a catalytically active metal of claim 1 wherein the catalytically active metal is palladium or platinum.

3. The strongly acid cation exchanger loaded with a catalytically active metal of claim 1 wherein the catalytically active metal is palladium.

4. The strongly acid cation exchanger loaded with a catalytically active metal of claim 1 which contains 0.01 to 10% by weight of formic acid, relative to the weight of the moist catalyst resin.

5. In the process for the preparation of a strongly acid cation exchanger loaded with a catalytically active metal by loading the cation exchanger with a solution of a salt of the catalytically active metal and reducing the cation exchanger loaded with the metal ions, the improvement which comprises carrying out the loading of the cation exchanger at a temperature of from 50° to 120° C. and using formic acid as the reducing agent.

6. The process of claim 5, wherein the loading of the cation exchanger is carried out at a temperature of from 70° to 100° C.

7. The process of claim 5, wherein the catalytically active metal is palladium or platinum.

8. The process of claim 5, wherein the catalytically active metal is palladium.

9. The process of claim 5, wherein the formic acid is not removed completely from the catalyst resin, but a concentration of formic acid is maintained in the moist catalyst resin, said concentration of formic acid being 0.01 to 10% by weight, relative to the weight of the moist catalyst resin.

* * * * *